United States Patent
Zhou et al.

(10) Patent No.: US 11,683,803 B2
(45) Date of Patent: Jun. 20, 2023

(54) MANAGING A GROUP OF PHYSICAL UPLINK CONTROL CHANNEL RESOURCES

(71) Applicant: QUALCOMM Incorporated, San Diego, CA (US)

(72) Inventors: Yan Zhou, San Diego, CA (US); Kiran Venugopal, Raritan, NJ (US); Tianyang Bai, Bridgewater, NJ (US); Jung Ho Ryu, Fort Lee, NJ (US); Mostafa Khoshnevisan, San Diego, CA (US); Ruiming Zheng, Beijing (CN); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 251 days.

(21) Appl. No.: 16/880,774

(22) Filed: May 21, 2020

(65) Prior Publication Data

US 2021/0051648 A1 Feb. 18, 2021

Related U.S. Application Data

(60) Provisional application No. 62/888,074, filed on Aug. 16, 2019.

(51) Int. Cl.
*H04W 4/00* (2018.01)
*H04W 72/21* (2023.01)

(52) U.S. Cl.
CPC .................. *H04W 72/21* (2023.01)

(58) Field of Classification Search
CPC .......... H04W 72/0413; H04W 72/042; H04W 72/1284; H04L 5/0053; H04L 5/0094
See application file for complete search history.

(56) References Cited

U.S. PATENT DOCUMENTS

2022/0045735 A1* 2/2022 Yang .................... H04L 5/0053

OTHER PUBLICATIONS

Ericsson: "RAN2 Aspects of Multi-Beam Enhancements", 3GPP Draft, R2-1910145, RAN2 Aspects of Multibeam Operation, 3rd Generation Partnership Project (3GPP), Mobile Competence Centre, 650, Route Des Lucioles, F-06921 Sophia-Antipolis Cedex, France, vol. RAN WG2, No. Prague, Czech, Republic, Aug. 26, 2019-Aug. 30, 2019, Aug. 15, 2019 (Aug. 15, 2019), XP051767926, 8 pages, Retrieved from the Internet: URL: http://www.3gpp.org/ftp/tsg_ran/WG2_RL2/TSGR2_107/Docs/R2-1910145.zip. [retrieved on Aug. 15, 2019] section 2.3.

(Continued)

*Primary Examiner* — Bo Hui A Zhu
(74) *Attorney, Agent, or Firm* — Qualcomm Incorporated

(57) ABSTRACT

In an embodiment, a base station determines a spatial relationship for a group of PUCCH resources, and transmits a control message that indicates the spatial relationship to a UE. The UE receives the control message and stores an indication of the spatial relationship. In some designs, the control message conveying the spatial relationship identifies the group of PUCCH resources via the PUCCH group index, while in other designs a different identification mechanism may be used. In another embodiment, a base station determines an association between a group of PUCCH resources and a PUCCH group index, and transmits a control message that indicates the association to a UE. The UE receives the control message and stores an indication of the association.

31 Claims, 14 Drawing Sheets

(56) References Cited

OTHER PUBLICATIONS

Fraunhofer Iis., et al., "Enhancements on Multi-TRP/panel Transmission", 3GPP Draft, R1-1907054, Multi-TRP, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 3, 2019 (May 3, 2019), XP051709087, 6 pages, Retrieved from the Internet: URL: http://www.3gpp.org/ftp/tsg%5Fran/WG1%5FRL1/TSGR1%5F97/Docs/R1%2D1907054%2Ezip. [retrieved on May 3, 2019] title. section 2. section 3.
International Search Report and Written Opinion—PCT/US2020/034276—ISA/EPO—dated Jul. 29, 2020.

\* cited by examiner

US 11,683,803 B2

MANAGING A GROUP OF PHYSICAL UPLINK CONTROL CHANNEL RESOURCES

CROSS-REFERENCE TO RELATED APPLICATION

The present Application for Patent claims the benefit of U.S. Provisional Application No. 62/888,074, entitled "MANAGING A GROUP OF PHYSICAL UPLINK CONTROL CHANNEL RESOURCES", filed Aug. 16, 2019, assigned to the assignee hereof and hereby expressly incorporated by reference herein in its entirety.

TECHNICAL FIELD

Various aspects described herein generally relate to managing a group of physical uplink control channel (PUCCH) resources.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

SUMMARY

An embodiment is directed to a method of operating a user equipment (UE), comprising receiving a control message that indicates a spatial relationship for a group of physical uplink control channel (PUCCH) resources, and updating an indication of the spatial relationship.

Another embodiment is directed to a method of operating a base station, comprising determining a spatial relationship for a group of physical uplink control channel (PUCCH) resources, and transmitting a control message that indicates the spatial relationship.

Another embodiment is directed to a method of operating a user equipment (UE), comprising receiving a control message that indicates an association between a group of physical uplink control channel (PUCCH) resources and a PUCCH group index, and storing an indication of the association.

Another embodiment is directed to a method of operating a base station, comprising determining an association between a group of physical uplink control channel (PUCCH) resources and a PUCCH group index, and transmitting a control message that indicates the association.

Another embodiment is directed to a user equipment (UE), comprising means for receiving a control message that indicates an association between a group of physical uplink control channel (PUCCH) resources and a PUCCH group index, and means for storing an indication of the association.

Another embodiment is directed to a base station, comprising means for determining an association between a group of physical uplink control channel (PUCCH) resources and a PUCCH group index, and means for transmitting a control message that indicates the association.

Another embodiment is directed to a user equipment (UE), comprising means for receiving a control message that indicates a spatial relationship for a group of physical uplink control channel (PUCCH) resources, and means for updating an indication of the spatial relationship.

Another embodiment is directed to a base station, comprising means for determining a spatial relationship for a group of physical uplink control channel (PUCCH) resources, and means for transmitting a control message that indicates the spatial relationship.

Another embodiment is directed to a user equipment (UE), comprising a memory, at least one transceiver, and at least one processor communicatively coupled to the processor and the at least one transceiver and configured to receive a control message that indicates an association between a group of physical uplink control channel (PUCCH) resources and PUCCH group index, and store an indication of the association.

Another embodiment is directed to a base station, comprising a memory, at least one transceiver, and at least one processor communicatively coupled to the processor and the at least one transceiver and configured to determine an association between a group of physical uplink control channel (PUCCH) resources and a PUCCH group index, and transmit a control message that indicates the association.

Another embodiment is directed to a user equipment (UE), comprising a memory, at least one transceiver, and at least one processor communicatively coupled to the processor and the at least one transceiver and configured to receive a control message that indicates a spatial relationship for a group of physical uplink control channel (PUCCH) resources, and update an indication of the spatial relationship.

Another embodiment is directed to a base station, comprising a memory, at least one transceiver, and at least one processor communicatively coupled to the processor and the at least one transceiver and configured to determine a spatial relationship for a group of physical uplink control channel (PUCCH) resources, and transmit a control message that indicates the spatial relationship.

Another embodiment is directed to a non-transitory computer-readable medium containing instructions stored thereon, which, when executed by a user equipment (UE), cause the UE to perform operations, the instructions comprising at least one instruction to cause the UE to receive a control message that indicates an association between a group of physical uplink control channel (PUCCH) resources and a PUCCH group index, and at least one instruction to cause the UE to store an indication of the association.

Another embodiment is directed to a non-transitory computer-readable medium containing instructions stored thereon, which, when executed by a base station, cause the base station to perform operations, the instructions comprising at least one instruction to cause the base station to determine an association between a group of physical uplink control channel (PUCCH) resources and a PUCCH group index, and at least one instruction to cause the base station to transmit a control message that indicates the association.

Another embodiment is directed to a non-transitory computer-readable medium containing instructions stored thereon, which, when executed by a user equipment (UE), cause the UE to perform operations, the instructions comprising at least one instruction to cause the UE to receive a control message that indicates a spatial relationship for a group of physical uplink control channel (PUCCH) resources, and at least one instruction to cause the UE to update an indication of the spatial relationship.

Another embodiment is directed to a non-transitory computer-readable medium containing instructions stored thereon, which, when executed by a base station, cause the base station to perform operations, the instructions comprising at least one instruction to cause the base station to determine a spatial relationship for a group of physical uplink control channel (PUCCH) resources, and at least one instruction to cause the base station to transmit a control message that indicates the spatial relationship.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
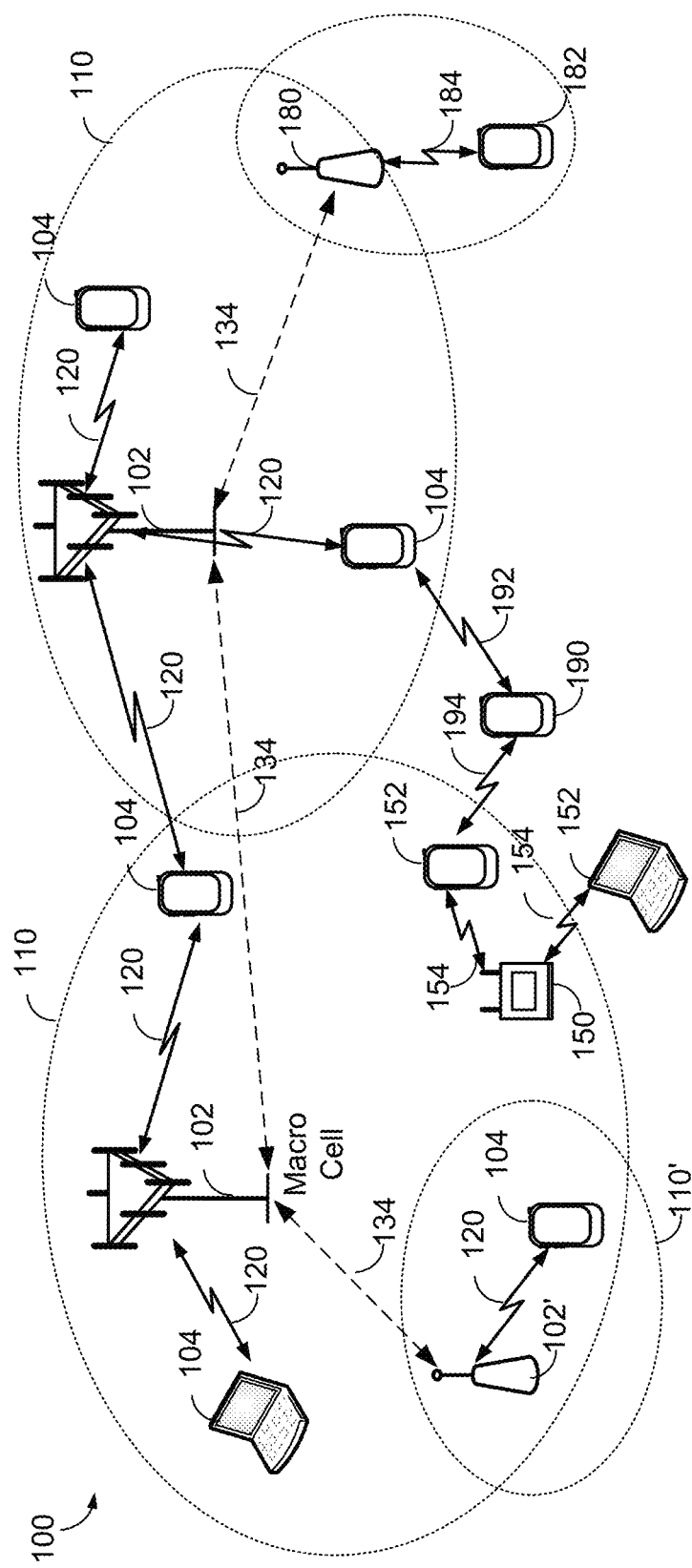
FIG. 1 illustrates an exemplary wireless communications system, according to various aspects.

Various aspects described herein generally relate to managing a group of physical uplink control channel (PUCCH) resources.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
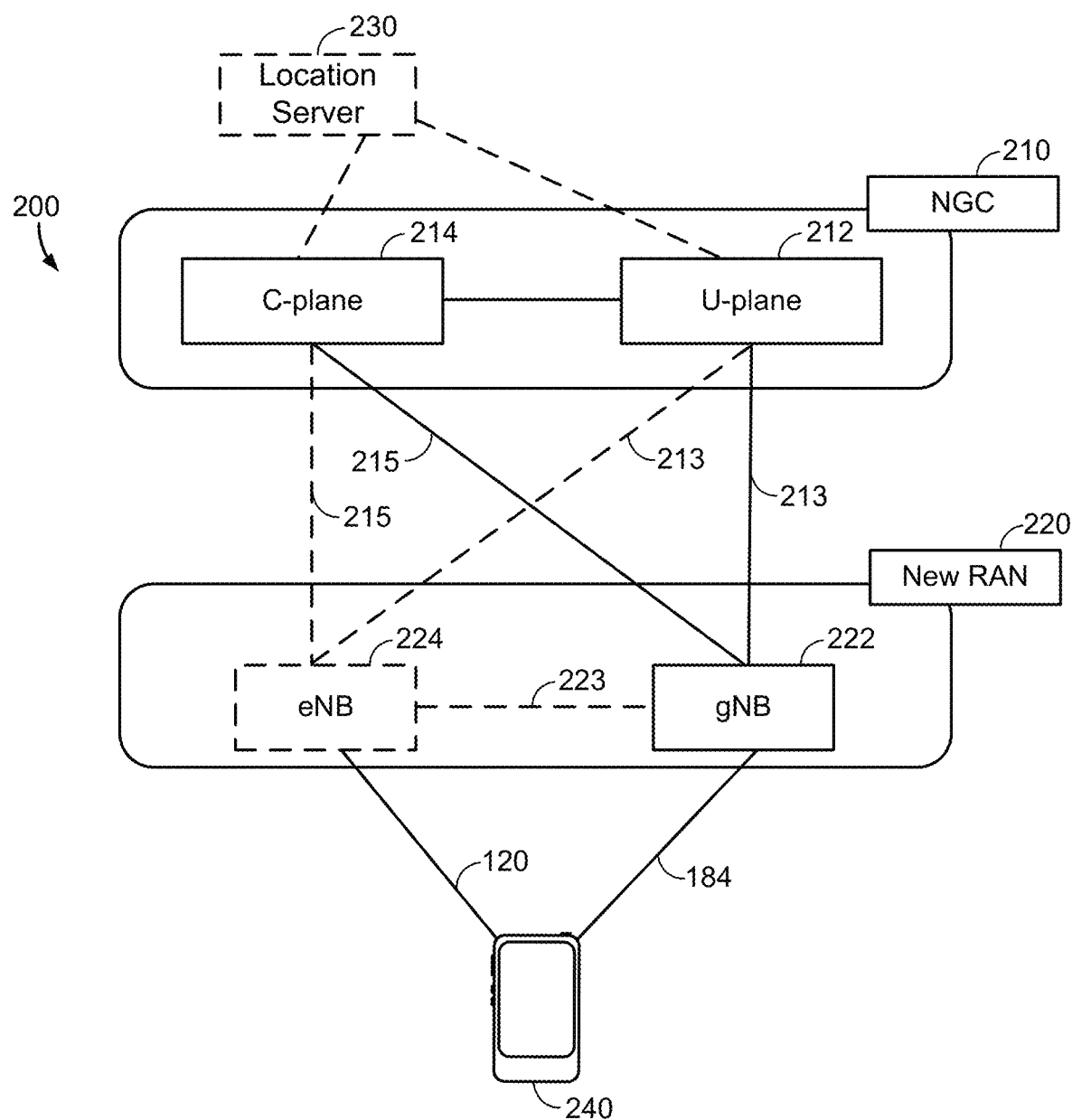
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 152, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
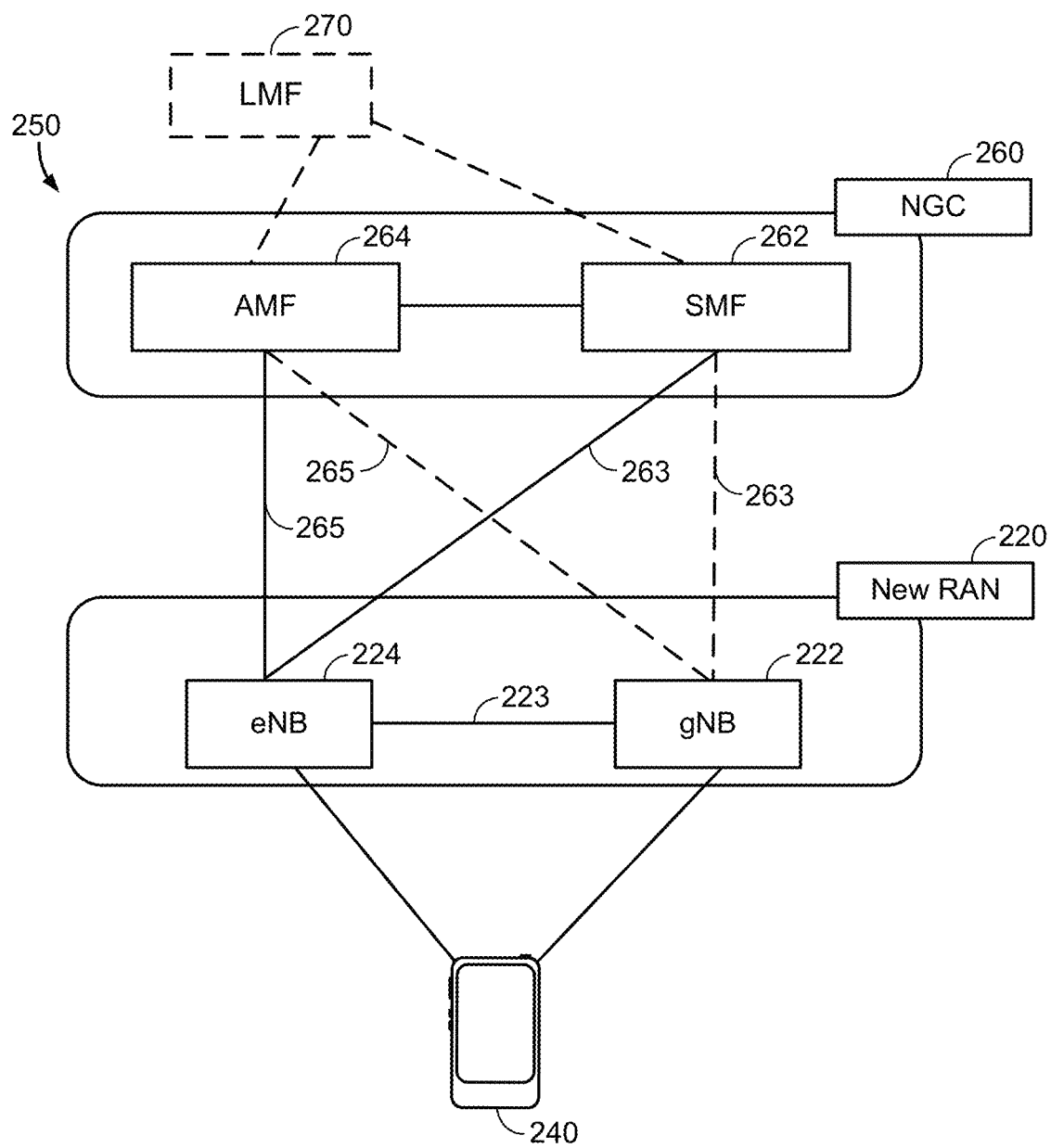

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 240. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 240 that can connect to the LMF 270 via the core network, NGC 260, and/or via the Internet (not illustrated).

Figure 3A:
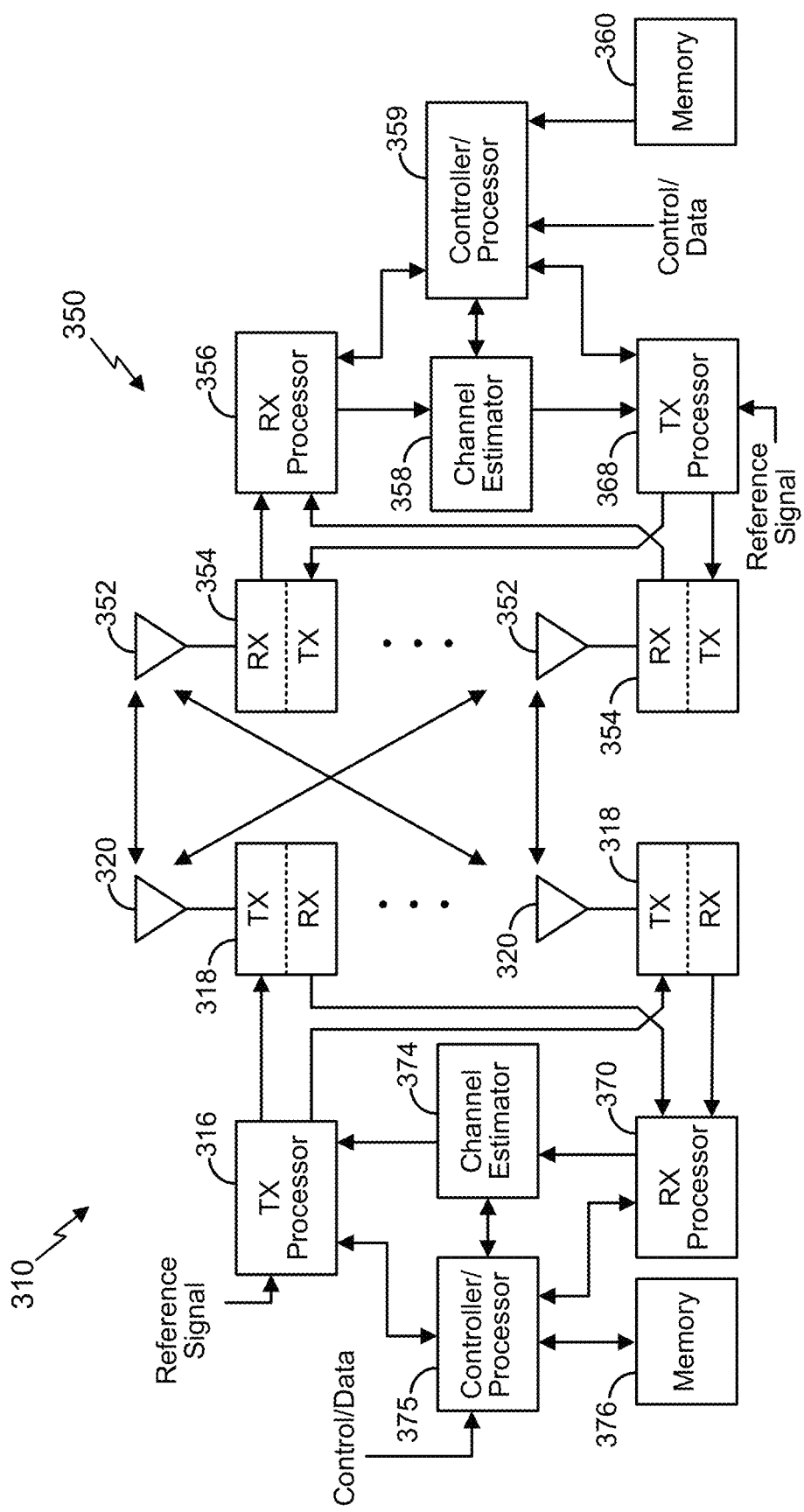
FIG. 3A illustrates an exemplary base station and an exemplary user equipment (UE) in an access network, according to various aspects.

According to various aspects, FIG. 3A illustrates an exemplary base station (BS) 310 (e.g., an eNB, a gNB, a small cell AP, a WLAN AP, etc.) in communication with an exemplary UE 350 (e.g., any of the UEs depicted in FIG. 1, such as UEs 104, UE 152, UE 182, UE 190, etc.) in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the processing system 359, which implements Layer-3 and Layer-2 functionality.

The processing system 359 can be associated with a memory 360 that stores program codes and data. The memory 360 may be referred to as a non-transitory computer-readable medium. In the UL, the processing system 359 provides demultiplexing between transport and logical channels, packet reassembly, deciphering, header decompression, and control signal processing to recover IP packets from the core network. The processing system 359 is also responsible for error detection.

Similar to the functionality described in connection with the DL transmission by the base station 310, the processing system 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission. In an aspect, the transmitters 354b and the receivers 354a may be one or more transceivers, one or more discrete transmitters, one or more discrete receivers, or any combination thereof.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370. In an aspect, the transmitters 318a and the receivers 318b may be one or more transceivers, one or more discrete transmitters, one or more discrete receivers, or any combination thereof.

The processing system 375 can be associated with a memory 376 that stores program codes and data. The memory 376 may be referred to as a non-transitory computer-readable medium. In the UL, the processing system 375 provides demultiplexing between transport and logical channels, packet reassembly, deciphering, header decompression, control signal processing to recover IP packets from the UE 350. IP packets from the processing system 375 may be provided to the core network. The processing system 375 is also responsible for error detection.

Figure 3B:
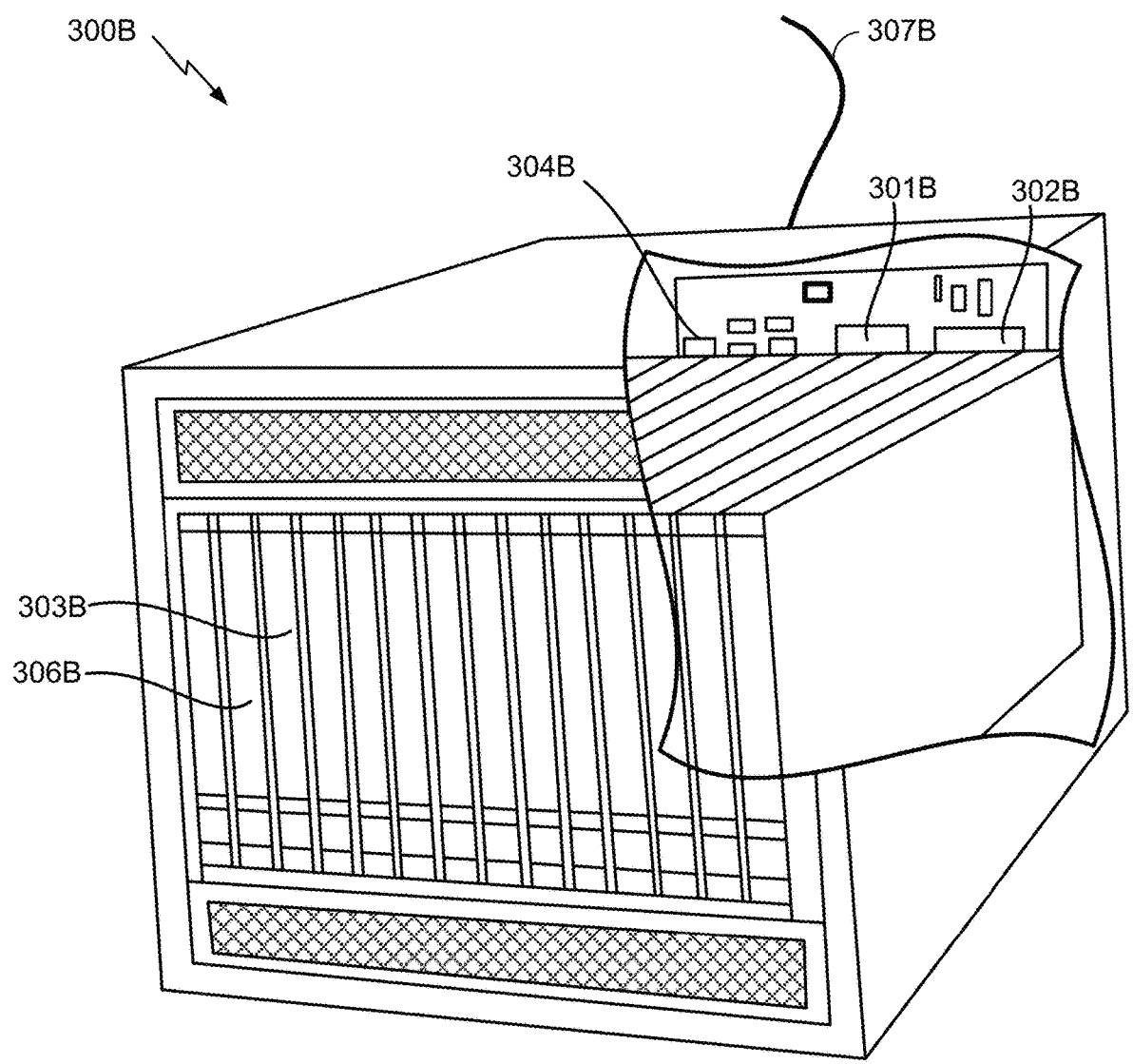
FIG. 3B illustrates an exemplary server according to various aspects.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
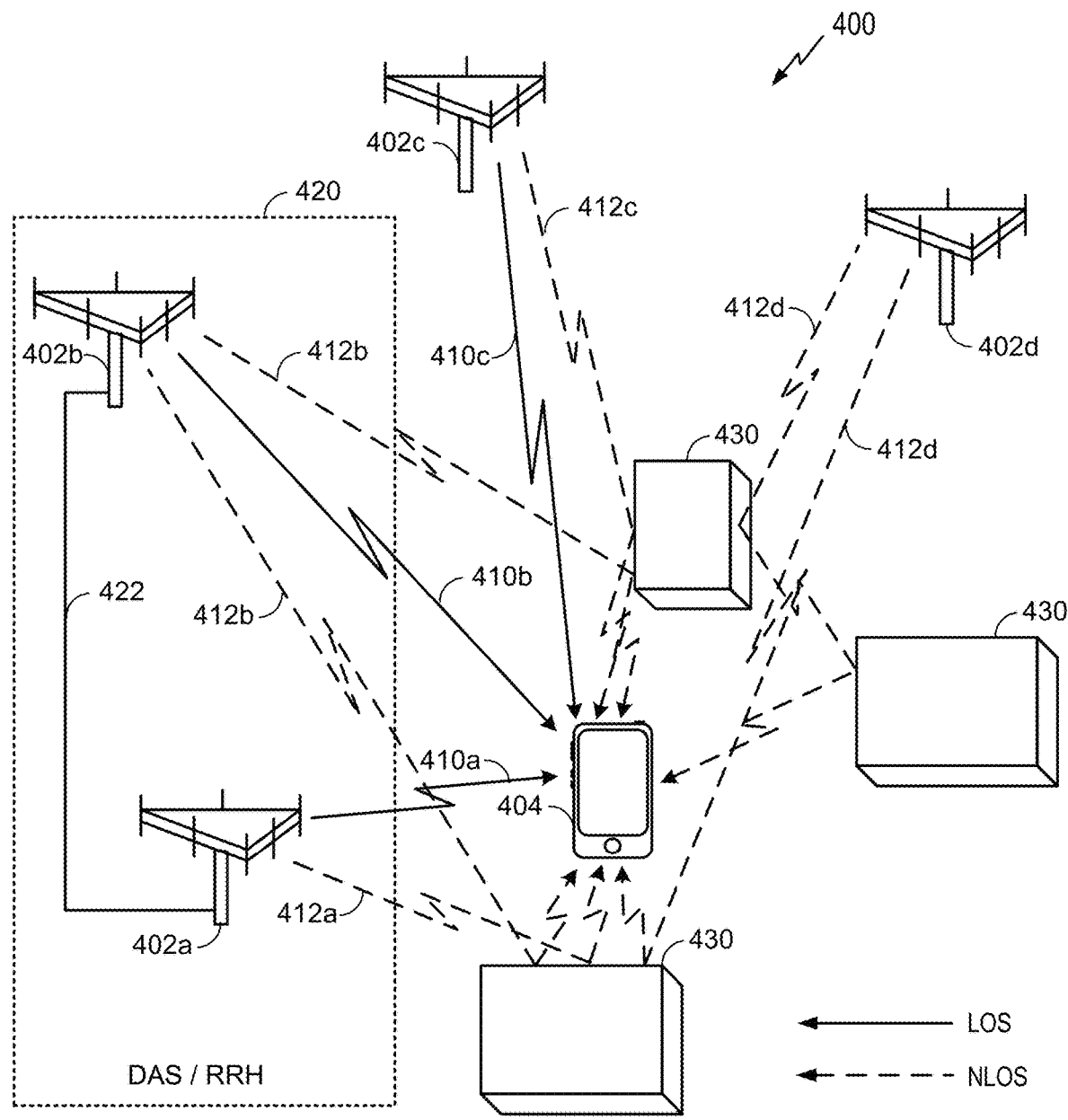
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

In NR 5G and certain legacy communication systems (e.g., LTE, etc.), a Physical Uplink Control Channel (PUCCH) is used by UEs to transmit uplink control information. In 3GPP Rel. 16, to reduce signaling overhead, a PUCCH grouping (or a group of PUCCH resources) and a single spatial relationship may be signaled per group of PUCCH resources via a single Medium Access Control (MAC) Command Element (CE). In some designs, the group of PUCCH resources for which the single spatial relationship is being updated corresponds to all the PUCCH resources in a particular bandwidth part (BWP). In other designs, two or more groups of PUCCH resources per BWP may be permitted. In some designs, each group of PUCCH resources may correspond to a different transmit receive point (TRP) (e.g., a UE TRP or gNB TRP) or to a different panel (e.g., a UE panel or a gNB panel).

Some embodiments of the disclosure are directed to establishing a PUCCH group index that can be used to identify a particular group of PUCCH resources. Other embodiments of the disclosure are directed to update a spatial relationship for a particular group of PUCCH resources via an implicit or explicit identification of the group of PUCCH resources in a single control message. These respective embodiments may be implemented in conjunction with each other or separately, as will be described in more detail below.

Figure 5:
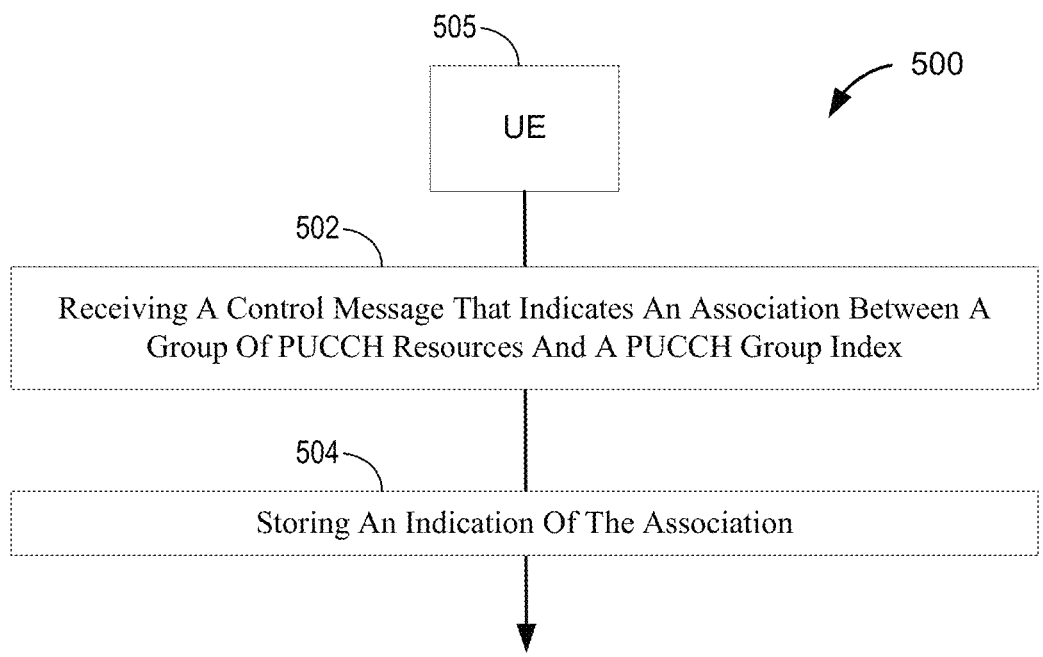
FIG. 5 illustrates an exemplary process of obtaining PUCCH information according to an aspect of the disclosure.

FIG. 5 illustrates an exemplary process 500 of obtaining PUCCH information according to an aspect of the disclosure. The process 500 of FIG. 5 is performed by a UE 505, which may correspond to any of the above-noted UEs (e.g., UE 240, 350, etc.). At 502, the UE 505 (e.g., antenna(s) 352, receiver(s) 354, RX processor 356, etc.) receives a control message that indicates an association between a group of PUCCH resources and a PUCCH group index. At 504, the UE 505 (e.g., controller/processor 359, etc.) stores an indication of the association (e.g., in a table maintained on the UE to permit the UE to associate subsequent control messages that reference the PUCCH group index as an explicit identification of the group of PUCCH resources).

Figure 6:
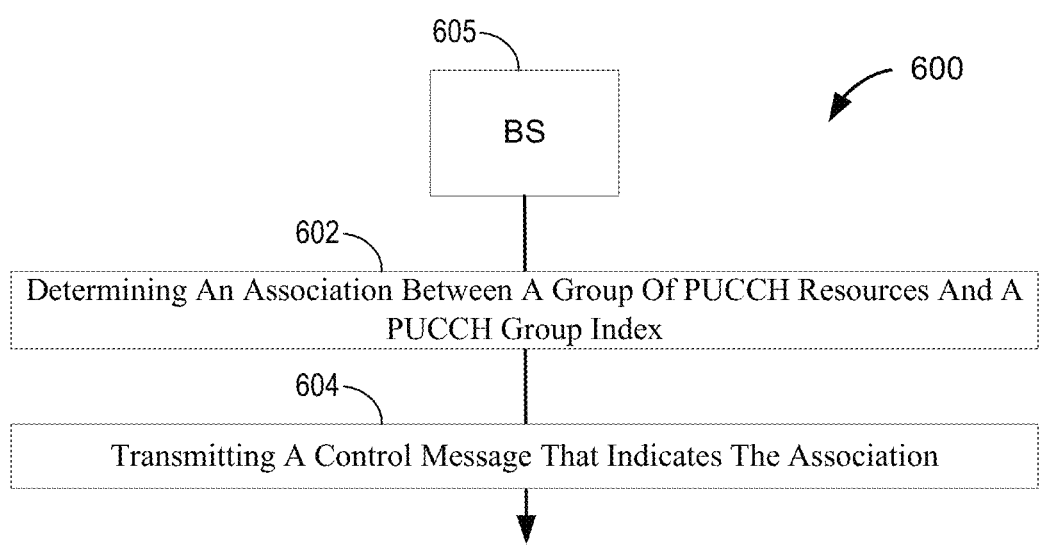
FIG. 6 illustrates an exemplary process of conveying PUCCH information according to an aspect of the disclosure.

FIG. 6 illustrates an exemplary process 600 of conveying PUCCH information according to an aspect of the disclosure. The process 600 of FIG. 6 is performed by a BS 605, which may correspond to any of the above-noted BSs (e.g., gNBs 222-224, BS 310, etc.). At 602, the BS 605 (e.g., controller/processor 375, etc.) determines an association between a group of PUCCH resources and a PUCCH group index. At 604, the BS 605 (e.g., antenna(s) 320, transmitter(s) 318, TX processor 316, etc.) transmits a control message that indicates the association.

Referring to FIGS. 5-6, in some designs, the processes 500-600 may be performed in parallel with the control message transmitted by the base station 605 at 604 corresponding to the control message received by the UE 505 at 502. In some designs, the control message may correspond to a MAC message, and the indication of the association is conveyed via a MAC CE.

Referring to FIGS. 5-6, in some designs, the control message further indicates an association between the group of PUCCH resources and a TRP. In an example, the TRP may correspond to a TRP of the base station 605 that transmits the control message at 604, or alternatively to a TRP of the UE 505 that receives the control message at 502. In other designs, the control message further indicates an association between the group of PUCCH resources and a panel. For example, a particular TRP may have a single panel antenna array (or single panel configuration) or a multi-panel antenna array (or multi-panel configuration), and the association for the group of PUCCH resources may be either TRP-specific or panel-specific. In an example, the panel or TRP may be indicated in the control message via a respective index. In the case of UE TRPs/panels or BS TRPs/panels, different respective indexes may be used.

Referring to FIGS. 5-6, in some designs, another control message may be transmitted by the base station 605 and received at the UE 505 which indicates a spatial relationship for the group of PUCCH resources. For example, the spatial relationship for the group of PUCCH resources may designate a transmit beam or a receive beam used to transport the group of PUCCH resources. In some designs, the another control message may explicitly identify the group of PUCCH resources via reference to the PUCCH group index. However, in other designs, the another control message may instead implement implicit identification of the group of PUCCH resources, as will be described in more detail below with respect to FIGS. 7-8.

Figure 7:
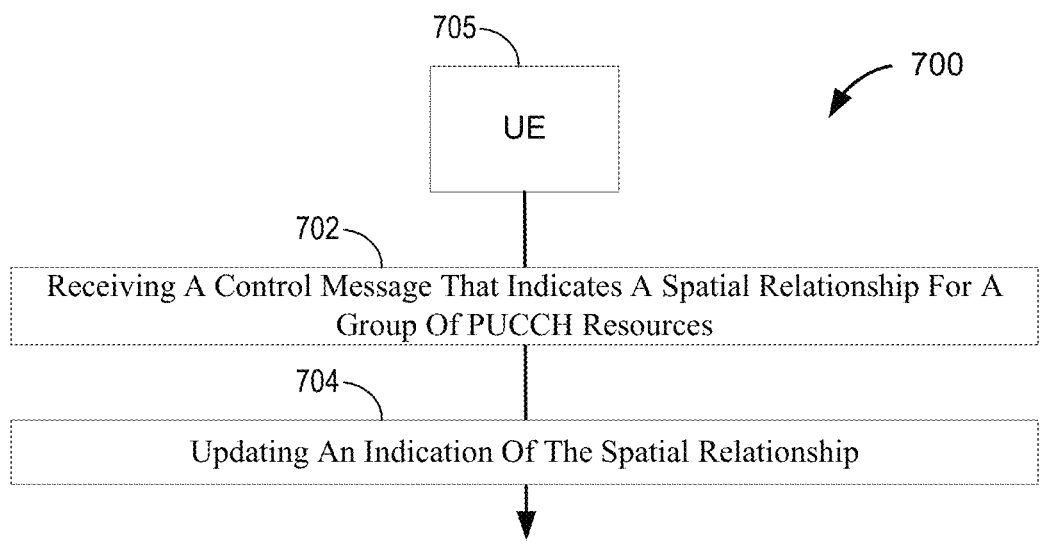
FIG. 7 illustrates an exemplary process of obtaining spatial information for PUCCH resources according to an aspect of the disclosure.

FIG. 7 illustrates an exemplary process 700 of obtaining spatial information for PUCCH resources according to an aspect of the disclosure. The process 700 of FIG. 7 is performed by a UE 705, which may correspond to any of the above-noted UEs (e.g., UE 240, 350, etc.). At 702, the UE 705 (e.g., antenna(s) 352, receiver(s) 354, RX processor 356, etc.) receives a control message that indicates a spatial relationship for a group of PUCCH resources. At 704, the UE 705 (e.g., controller/processor 359, etc.) stores an indication of the spatial relationship.

Figure 8:
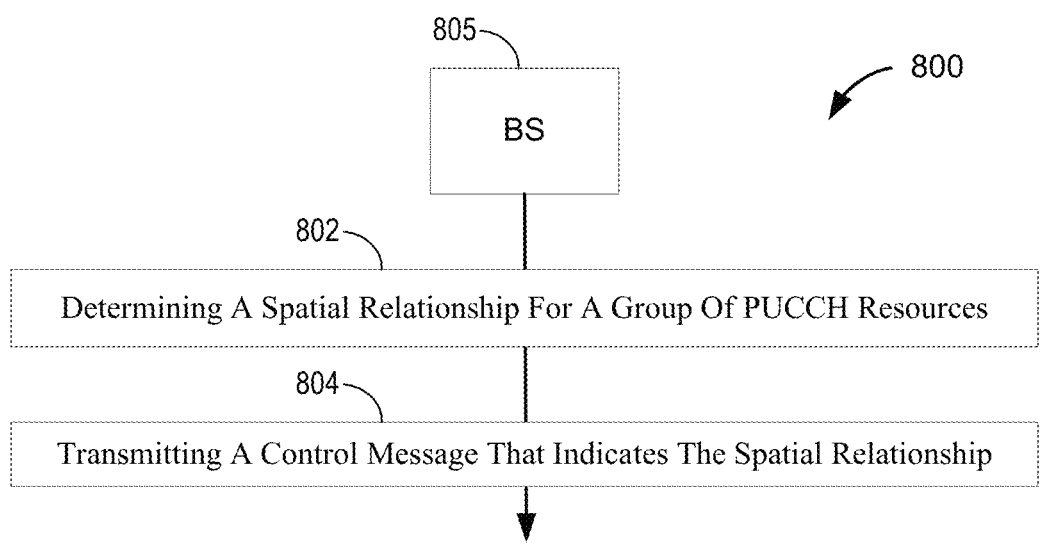
FIG. 8 illustrates an exemplary process of conveying spatial information for PUCCH resources according to an aspect of the disclosure.

FIG. 8 illustrates an exemplary process 800 of conveying spatial information for PUCCH resources according to an aspect of the disclosure. The process 800 of FIG. 8 is performed by a BS 805, which may correspond to any of the above-noted BSs (e.g., gNBs 222-224, BS 310, etc.). At 802, the BS 805 (e.g., controller/processor 375, etc.) determines a spatial relationship for a group of PUCCH resources. At 804, the BS 805 (e.g., antenna(s) 320, transmitter(s) 318, TX processor 316, etc.) transmits a control message that indicates the spatial relationship.

Referring to FIGS. 7-8, in some designs, the processes 700-800 may be performed in parallel with the control message transmitted by the base station 805 at 804 corresponding to the control message received by the UE 705 at 702. In some designs, the control message may correspond to a MAC message, and the indication of the spatial relationship is conveyed via a MAC CE. In some designs, the spatial relationship indicated by shared or common by all PUCCH resources in the group of PUCCH resources.

Referring to FIGS. 7-8, in some designs, the control message may explicitly identify the group of PUCCH resources via a PUCCH group index, such as the PUCCH group index described above with respect to FIGS. 5-6. In this case, the control message of FIGS. 5-6 may first convey the PUCCH group index to the UE, after which the control message of FIGS. 7-8 may be used to provide an updated spatial relationship for the group of PUCCH resources with the group of PUCCH resources being identified by the earlier conveyed PUCCH group index.

Referring to FIGS. 7-8, in some designs, the control message implicitly identifies the group of PUCCH resources via identification of a PUCCH resource identifier that belongs to the group of PUCCH resources. For example, assume that the group of PUCCH resources includes PUCCH resources 1 . . . N. In this example, an individual reference to any one of the PUCCH resources 1 . . . N may be used as an implicit indication of the PUCCH group to which that individual resource belongs. So, a reference (or PUCCH resource identifier) to PUCCH resource 3 may be interpreted by the UE 705 as an implicit identification of PUCCH resources 1 . . . N.

Figure 9A:
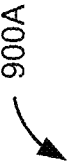
FIG. 9A illustrates an example MAC CE format with a PUCCH Resource ID for an individual PUCCH resource.

In a further example, some control messages may be configured to include an individual PUCCH resource identifier either to function as an identifier for an individual PUCCH resource or as an implicit identification of a group of PUCCH resources. FIG. 9A illustrates an example MAC CE format 900A whereby a PUCCH Resource ID for an individual PUCCH resource. The MAC CE format 900A is defined in 3GPP TS 38.321 Rel. 15 at 6.1.3.18. In some designs, one of the reserved bits, R, may be configured to indicate an individual or group association for the PUCCH Resource ID. For example, if a designated reserve bit R is set to '0', then the PUCCH Resource ID is configured to identify an individual PUCCH resource, and if the designated reserve bit R is set to '1', then the PUCCH Resource ID is configured to identify an entire group of PUCCH resources to which the PUCCH Resource ID belongs. In some designs, the signaling (or information) that indicates whether the identification of the PUCCH resource identifier is a reference to the group of PUCCH resources (in the above-noted example, the designated reserved bit R) may be included either in the control message of 702 or 804, or alternatively in a separate control message. In some designs, the MAC CE format 900A may be part of an RRC message, a MAC CE or a DCI message from the base station (or gNB), or alternatively from a MAC CE or capability message from the UE.

Figure 9B:
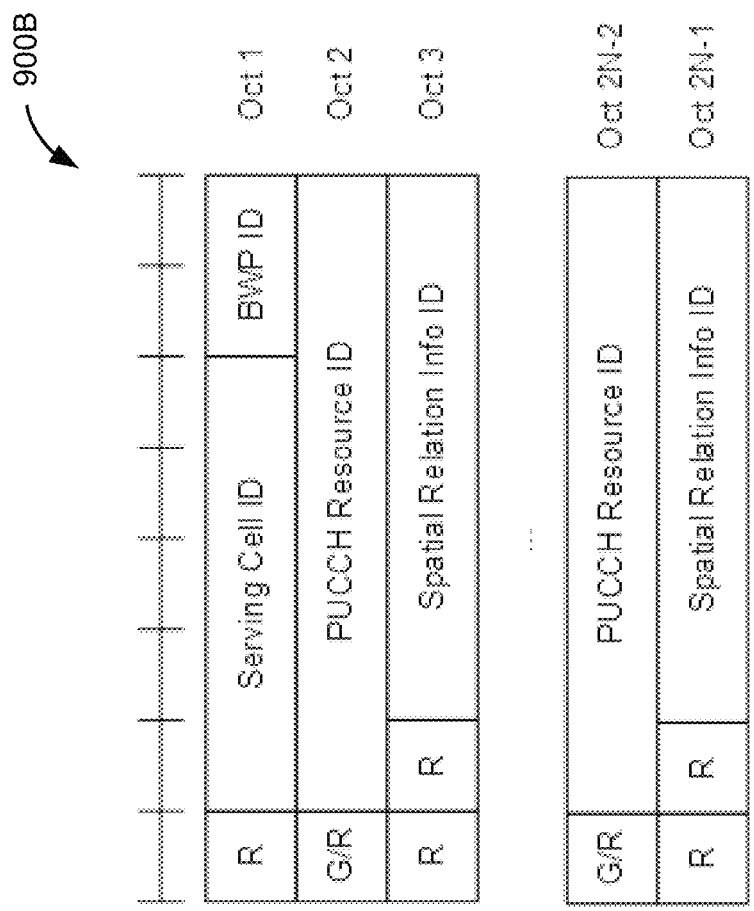
FIG. 9B illustrates an enhanced PUCCH spatial relation Activation/Deactivation MAC CE in accordance with an embodiment of the disclosure.

FIG. 9B illustrates an enhanced PUCCH spatial relation Activation/Deactivation MAC CE 900B in accordance with an embodiment of the disclosure. In particular, the enhanced PUCCH spatial relation Activation/Deactivation MAC CE 900B is representative of another example of the control message from any of FIGS. 5-8.

In some designs, the enhanced PUCCH spatial relation Activation/Deactivation MAC CE 900B of FIG. 9B may be identified by a MAC subheader with logical channel identifier (LCD) as specified in Table 6.2.1-1 of TS 38.321. In a specific example, the enhanced PUCCH spatial relation Activation/Deactivation MAC CE 900B may have a variable size with following fields:

Serving Cell ID: This field indicates the identity of the Serving Cell for which the MAC CE applies. The length of the field is 5 bits;

BWP ID: This field indicates a UL BWP for which the MAC CE applies as the codepoint of the DCI bandwidth part indicator field as specified in TS 38.212 [9]. The length of the BWP ID field is 2 bits;

PUCCH Resource ID: This field contains an identifier of the PUCCH resource ID identified by PUCCH-ResourceId as specified in TS 38.331 [5]. The length of the field is 7 bits. If the indicated PUCCH Resource is configured as part of a PUCCH Group as specified in TS 38.331 [5], this MAC CE applies to all the PUCCH Resources in the PUCCH group Spatial Relation Info ID: This field contains an identifier of the PUCCH Spatial Relation Info ID identified by PUCCH-SpatialRelationInfoId as specified in TS 38.331 [5]. The length of the field is 6 bits;

R: Reserved bit, set to 0.

Referring to FIGS. 7-8, in some designs, a grouping of PUCCH resources may quasi-static and may thereby change less frequently than an associated spatial relationship for the group. Accordingly, in a scenario where the PUCCH group index is used to update the grouping of PUCCH resources as in FIGS. 5-6 in conjunction with a spatial relationship update as in FIGS. 7-8, the spatial relationship update as in FIGS. 7-8 may occur more frequently than the PUCCH group update as in FIGS. 5-6.

Figure 10:
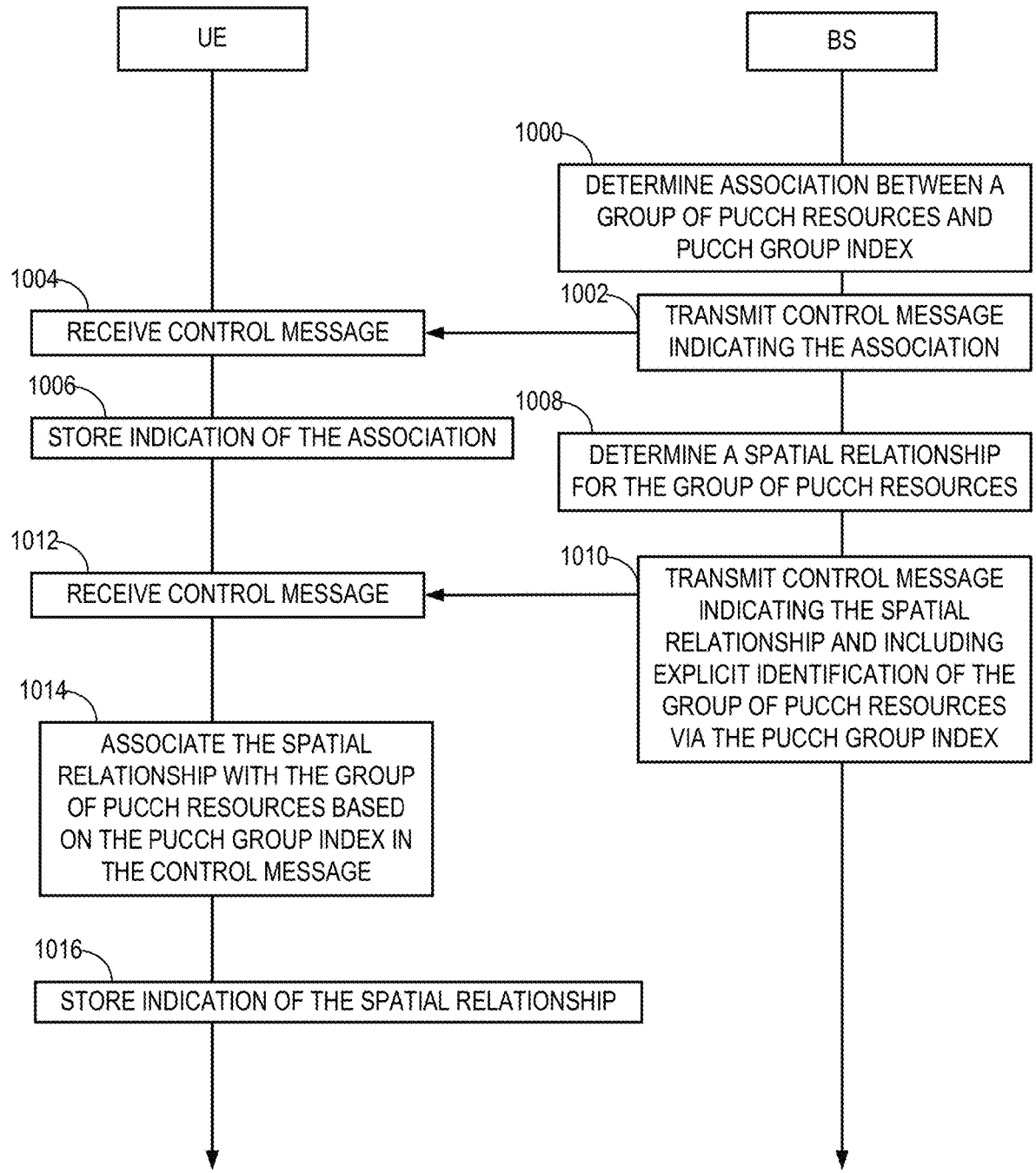
FIG. 10 illustrates an example implementation of the processes of FIGS. 5-8 in accordance with an embodiment of the disclosure.

FIG. 10 illustrates an example implementation of the processes 500-800 of FIGS. 5-8 in accordance with an embodiment of the disclosure. In particular, FIG. 10 relates to an example whereby the group of PUCCH resources is explicitly identified via a PUCCH group index.

Referring to FIG. 10, at 1000 (e.g., as in 602 of FIG. 6), a BS determines an association between a group of PUCCH resources and a PUCCH group index. At 1002 (e.g., as in 604 of FIG. 6), the BS transmits a control message indication the association, and at 1004 (e.g., as in 502 of FIG. 5), a UE receives the control message. At 1006 (e.g., as in 504 of FIG. 5), the UE stores an indication of the association.

Referring to FIG. 10, at 1008 (e.g., as in 802 of FIG. 8), the BS determines a spatial relationship for the group of PUCCH resources. At 1010 (e.g., as in 804 of FIG. 8), the BS transmits a control message indication the spatial relationship, and at 1010 (e.g., as in 702 of FIG. 7), the UE receives the control message. Because the BS has already conveyed the PUCCH group index association to the UE, the control message of 1010-1012 includes the PUCCH group index so as to explicitly identify the group of PUCCH resources to the UE. Accordingly, at 1014, the UE associates the spatial relationship with the group of PUCCH resources based on the PUCCH group index in the control message. At 1016 (e.g., as in 704 of FIG. 7), the UE stores an indication of the association for the group of PUCCH resources.

Figure 11:
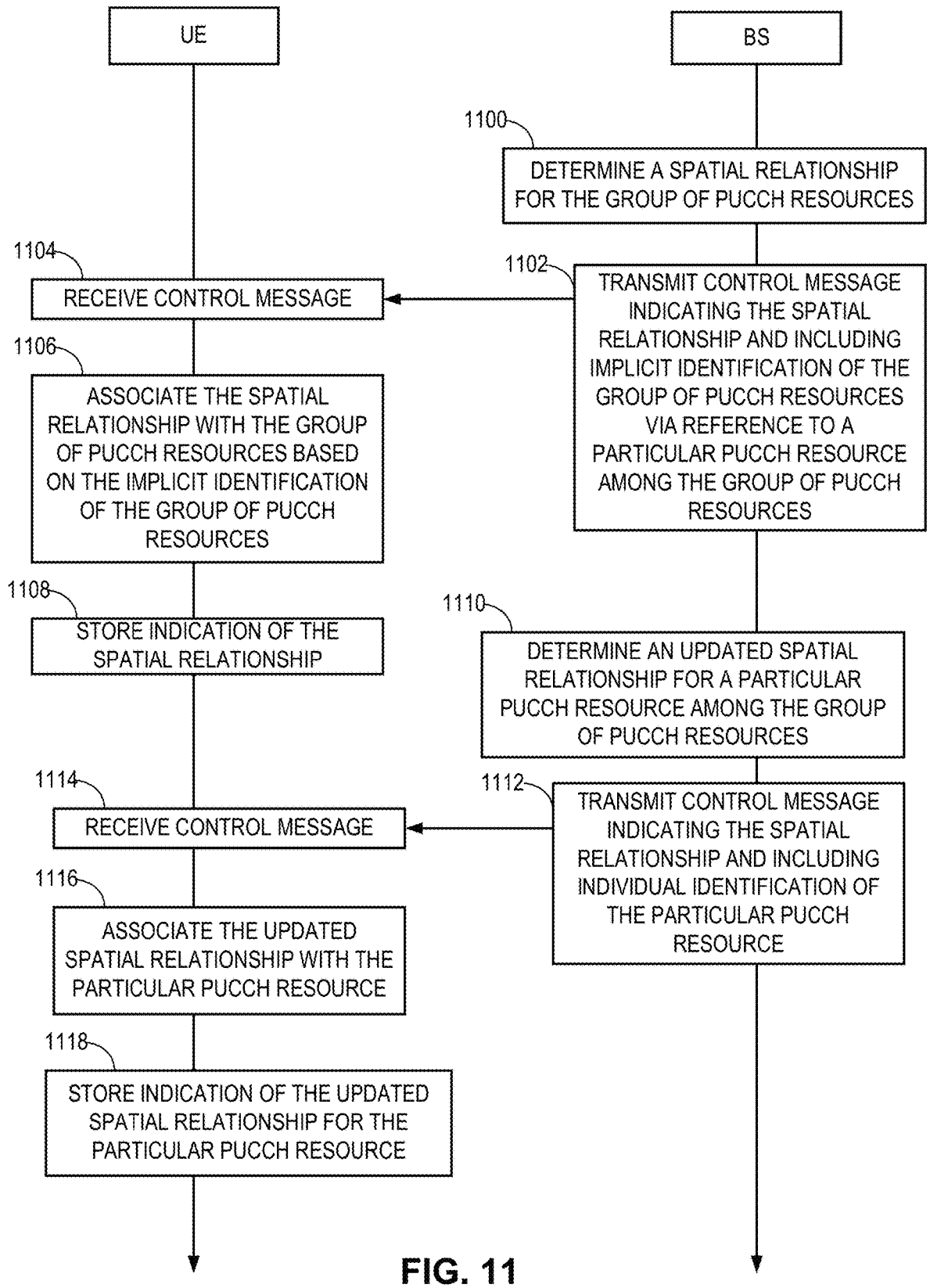
FIG. 11 illustrates an example implementation of the processes of FIGS. 7-8 in accordance with an embodiment of the disclosure.

FIG. 11 illustrates an example implementation of the processes 700-800 of FIGS. 7-8 in accordance with an embodiment of the disclosure. In particular, FIG. 11 relates to an example whereby the group of PUCCH resources is implicitly identified via a PUCCH Resource ID for a particular PUCCH resource that belongs to the group of PUCCH resources.

Referring to FIG. 11, at 1100 (e.g., as in 802 of FIG. 8), a BS determines a spatial relationship for a group of PUCCH resources. At 1102 (e.g., as in 804 of FIG. 8), the BS transmits a control message indication the spatial relationship, and at 1104 (e.g., as in 702 of FIG. 7), the UE receives the control message. In contrast to FIG. 10, the control message of 1102-1104 includes a PUCCH Resource ID for a particular PUCCH resource that belongs to the group of PUCCH resources, as discussed above with respect to FIG. 9. Moreover, the MAC CE carrying the PUCCH Resource ID is configured to convey to the UE that the PUCCH Resource ID is intended to function as a PUCCH resource group identifier as opposed to an individual PUCCH resource identifier (e.g., via the designated reserve bit of the MAC CE being set to '1', etc.). It is assumed here that the UE is already aware of the group of PUCCH resources, such that the UE can compare the PUCCH Resource ID in the control message to the PUCCH Resource IDs of the group of PUCCH resources so as to find a PUCCH Resource ID match to identify the implicit association. Accordingly, at 1106, the UE associates the spatial relationship with the group of PUCCH resources based on the implicit indication via the PUCCH Resource ID in the control message. At 1108 (e.g., as in 704 of FIG. 7), the UE stores an indication of the spatial relationship for the group of PUCCH resources.

Referring to FIG. 11, at 1110, the BS determines an updated spatial relationship for a particular PUCCH resource among the group of PUCCH resources. At 1112, the BS transmits a control message indicating the updated spatial relationship for the particular PUCCH resource, and at 1114, the UE receives the control message. In contrast to 1102-1104, the control message of 1112-1114, the MAC CE carrying the PUCCH Resource ID is configured to convey to the UE that the PUCCH Resource ID is intended to function as an individual PUCCH resource identifier instead of a PUCCH resource group identifier (e.g., via the designated reserve bit of the MAC CE being set to '0', etc.). Accordingly, at 1116, the UE associates the spatial relationship with the particular PUCCH resource (as opposed to the entire group of PUCCH resources). At 1118, the UE stores an indication of the spatial relationship for the group of PUCCH resources. Accordingly, FIG. 11 demonstrates an example whereby a PUCCH Resource ID can be 'toggled' between a group PUCCH resource indication and an individual PUCCH resource indication.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a user equipment (UE), comprising:
   receiving a control message that indicates a spatial relationship for a group of physical uplink control channel (PUCCH) resources; and
   updating an indication of the spatial relationship,
   wherein the control message implicitly identifies the group of PUCCH resources via identification of a PUCCH resource identifier that belongs to the group of PUCCH resources, and
   wherein the method further comprises identifying a PUCCH group index of the group of PUCCH resources based on the PUCCH resource identifier and association information indicating an association between the group of PUCCH resources and the PUCCH group index.

2. The method of claim 1, wherein the spatial relationship indicated by the control message is common to each PUCCH resource in the group of PUCCH resources.

3. The method of claim 1, further comprising:
   receiving indication information that indicates whether the identification of the PUCCH resource identifier is a reference to the group of PUCCH resources.

4. The method of claim 3, wherein the indication information is included in the control message or a separate control message.

5. A method of operating a base station, comprising:
   determining a spatial relationship for a group of physical uplink control channel (PUCCH) resources; and
   transmitting a control message that indicates the spatial relationship,
   wherein the control message implicitly identifies the group of PUCCH resources via identification of a PUCCH resource identifier that belongs to the group of PUCCH resources, and
   wherein the PUCCH resource identifier renders a PUCCH group index of the group of PUCCH resources identifiable based on the PUCCH resource identifier and association information indicating an association between the group of PUCCH resources and the PUCCH group index.

6. The method of claim 5, wherein the spatial relationship indicated by the control message is common to each PUCCH resource in the group of PUCCH resources.

7. The method of claim 5, further comprising:
   transmitting indication information that indicates whether the identification of the PUCCH resource identifier is a reference to the group of PUCCH resources.

8. The method of claim 7, wherein the indication information is included in the control message or a separate control message.

9. A method of operating a user equipment (UE), comprising:
   receiving a control message that includes association information indicating an association between a group of physical uplink control channel (PUCCH) resources and a PUCCH group index;
   storing the association information;
   receiving another control message that indicates a spatial relationship for the group of PUCCH resources; and
   storing an indication of the spatial relationship,
   wherein the another control message implicitly identifies the group of PUCCH resources via identification of a PUCCH resource identifier that belongs to the group of PUCCH resources, and
   wherein the method further comprises identifying the PUCCH group index of the group of PUCCH resources based on the PUCCH resource identifier and the association information.

10. The method of claim 9,
    wherein the control message further indicates an association between the group of PUCCH resources and a transmission reception point (TRP) of the UE, or
    wherein the control message further indicates an association between the group of PUCCH resources and a TRP of a base station from which the control message is received.

11. The method of claim 9,
    wherein the control message further indicates an association between the group of PUCCH resources and a panel of the UE, or
    wherein the control message further indicates an association between the group of PUCCH resources and a panel of a base station from which the control message is received.

12. The method of claim 9,
    wherein the control message is a medium access control (MAC) message, and
    wherein the association is indicated via a MAC control element (CE) of the MAC message.

13. A method of operating a base station, comprising:
    determining an association between a group of physical uplink control channel (PUCCH) resources and a PUCCH group index;
    transmitting a control message that includes association information indicating the association;
    determining a spatial relationship for the group of PUCCH resources; and
    transmitting another control message that indicates the spatial relationship,
    wherein the another control message implicitly identifies the group of PUCCH resources via identification of a PUCCH resource identifier that belongs to the group of PUCCH resources, and
    wherein the PUCCH resource identifier renders the PUCCH group index of the group of PUCCH resources identifiable based on the PUCCH resource identifier and the association information.

14. The method of claim 13,
    wherein the control message further indicates an association between the group of PUCCH resources and a transmission reception point (TRP) of a user equipment (UE), or
    wherein the control message further indicates an association between the group of PUCCH resources and a TRP of a base station from which the control message is received.

15. The method of claim 13,
    wherein the control message further indicates an association between the group of PUCCH resources and a panel of a UE, or
    wherein the control message further indicates an association between the group of PUCCH resources and a panel of a base station from which the control message is received.

16. The method of claim 13, wherein the control message is a medium access control (MAC) message.

17. The method of claim 16, wherein the association is indicated via a MAC control element (CE) of the MAC message.

18. A user equipment (UE), comprising:
means for receiving a control message that includes association information indicating an association between a group of physical uplink control channel (PUCCH) resources and a PUCCH group index;
means for storing the association information;
means for receiving another control message that indicates a spatial relationship for the group of PUCCH resources; and
means for storing an indication of the spatial relationship,
wherein the another control message implicitly identifies the group of PUCCH resources via identification of a PUCCH resource identifier that belongs to the group of PUCCH resources, and
wherein the UE further comprises means for identifying a PUCCH group index of the group of PUCCH resources based on the PUCCH resource identifier and the association information.

19. A base station, comprising:
means for determining an association between a group of physical uplink control channel (PUCCH) resources and a PUCCH group index;
means for transmitting a control message that includes association information indicating the association;
means for determining a spatial relationship for the group of PUCCH resources; and
means for transmitting another control message that indicates the spatial relationship,
wherein the another control message implicitly identifies the group of PUCCH resources via identification of a PUCCH resource identifier that belongs to the group of PUCCH resources, and
wherein the PUCCH resource identifier renders the PUCCH group index of the group of PUCCH resources identifiable based on the PUCCH resource identifier and the association information.

20. A user equipment (UE), comprising:
means for receiving a control message that indicates a spatial relationship for a group of physical uplink control channel (PUCCH) resources; and
means for updating an indication of the spatial relationship,
wherein the control message implicitly identifies the group of PUCCH resources via identification of a PUCCH resource identifier that belongs to the group of PUCCH resources, and
wherein the UE further comprises means for identifying a PUCCH group index of the group of PUCCH resources based on the PUCCH resource identifier and association information indicating an association between the group of PUCCH resources and the PUCCH group index.

21. A base station, comprising:
means for determining a spatial relationship for a group of physical uplink control channel (PUCCH) resources; and
means for transmitting a control message that indicates the spatial relationship,
wherein the control message implicitly identifies the group of PUCCH resources via identification of a PUCCH resource identifier that belongs to the group of PUCCH resources, and
wherein the PUCCH resource identifier renders a PUCCH group index of the group of PUCCH resources identifiable based on the PUCCH resource identifier and association information indicating an association between the group of PUCCH resources and the PUCCH group index.

22. A user equipment (UE), comprising:
a memory;
at least one transceiver; and
at least one processor communicatively coupled to the processor and the at least one transceiver and configured to:
receive a control message that includes association information indicating an association between a group of physical uplink control channel (PUCCH) resources and PUCCH group index;
store the association information;
receive another control message that indicates a spatial relationship for the group of PUCCH resources; and
store an indication of the spatial relationship,
wherein the another control message implicitly identifies the group of PUCCH resources via identification of a PUCCH resource identifier that belongs to the group of PUCCH resources, and
wherein the at least one processor is further configured to identify the PUCCH group index of the group of PUCCH resources based on the PUCCH resource identifier and the association information.

23. A base station, comprising:
a memory;
at least one transceiver; and
at least one processor communicatively coupled to the processor and the at least one transceiver and configured to:
determine an association between a group of physical uplink control channel (PUCCH) resources and a PUCCH group index;
transmit a control message that includes association information indicating the association;
determine a spatial relationship for the group of PUCCH resources; and
transmit another control message that indicates the spatial relationship,
wherein the another control message implicitly identifies the group of PUCCH resources via identification of a PUCCH resource identifier that belongs to the group of PUCCH resources, and
wherein the PUCCH resource identifier renders the PUCCH group index of the group of PUCCH resources identifiable based on the PUCCH resource identifier and the association information.

24. A user equipment (UE), comprising:
a memory;
at least one transceiver; and
at least one processor communicatively coupled to the processor and the at least one transceiver and configured to:
receive a control message that indicates a spatial relationship for a group of physical uplink control channel (PUCCH) resources; and
update an indication of the spatial relationship,
wherein the control message implicitly identifies the group of PUCCH resources via identification of a PUCCH resource identifier that belongs to the group of PUCCH resources, and
wherein the at least one processor is further configured to identify a PUCCH group index of the group of PUCCH resources based on the PUCCH resource identifier and association information indicating an association between the group of PUCCH resources and the PUCCH group index.

25. The UE of claim 24, wherein the at least one processor is further configured to:
receive indication information that indicates whether the identification of the PUCCH resource identifier is a reference to the group of PUCCH resources.

26. A base station, comprising:
a memory;
at least one transceiver; and
at least one processor communicatively coupled to the processor and the at least one transceiver and configured to:
determine a spatial relationship for a group of physical uplink control channel (PUCCH) resources; and
transmit a control message that indicates the spatial relationship,
wherein the control message implicitly identifies the group of PUCCH resources via identification of a PUCCH resource identifier that belongs to the group of PUCCH resources, and
wherein the PUCCH resource identifier renders a PUCCH group index of the group of PUCCH resources identifiable based on the PUCCH resource identifier and association information indicating an association between the group of PUCCH resources and the PUCCH group index.

27. The base station of claim 26, wherein the at least one processor is further configured to:
transmit indication information that indicates whether the identification of the PUCCH resource identifier is a reference to the group of PUCCH resources.

28. A non-transitory computer-readable medium containing instructions stored thereon, which, when executed by a user equipment (UE), cause the UE to perform operations, the instructions comprising:
at least one instruction to cause the UE to receive a control message that includes association information indicating an association between a group of physical uplink control channel (PUCCH)resources and a PUCCH group index;
at least one instruction to cause the UE to store the association information;
at least one instruction to cause the UE to receive another control message that indicates a spatial relationship for the group of PUCCH resources; and
at least one instruction to cause the UE to store an indication of the spatial relationship,
wherein the another control message implicitly identifies the group of PUCCH resources via identification of a PUCCH resource identifier that belongs to the group of PUCCH resources, and
wherein the instructions comprises at least one instruction to cause the UE to identify the PUCCH group index of the group of PUCCH resources based on the PUCCH resource identifier and the association information.

29. A non-transitory computer-readable medium containing instructions stored thereon, which, when executed by a base station, cause the base station to perform operations, the instructions comprising:

at least one instruction to cause the base station to determine an association between a group of physical uplink control channel (PUCCH) resources and a PUCCH group index; and
at least one instruction to cause the base station to transmit a control message that includes association information indicating the association;
at least one instruction to cause the base station to determine a spatial relationship for the group of PUCCH resources; and
at least one instruction to cause the base station to transmit another control message that indicates the spatial relationship,
wherein the another control message implicitly identifies the group of PUCCH resources via identification of a PUCCH resource identifier that belongs to the group of PUCCH resources, and
wherein the PUCCH resource identifier renders the PUCCH group index of the group of PUCCH resources identifiable based on the PUCCH resource identifier and the association information.

30. A non-transitory computer-readable medium containing instructions stored thereon, which, when executed by a user equipment (UE), cause the UE to perform operations, the instructions comprising:
at least one instruction to cause the UE to receive a control message that indicates a spatial relationship for a group of physical uplink control channel (PUCCH) resources; and
at least one instruction to cause the UE to update an indication of the spatial relationship,
wherein the control message implicitly identifies the group of PUCCH resources via identification of a PUCCH resource identifier that belongs to the group of PUCCH resources, and
wherein the instructions further comprise at least one instruction to cause the UE to identify a PUCCH group index of the group of PUCCH resources based on the PUCCH resource identifier and association information indicating an association between the group of PUCCH resources and the PUCCH group index.

31. A non-transitory computer-readable medium containing instructions stored thereon, which, when executed by a base station, cause the base station to perform operations, the instructions comprising:
at least one instruction to cause the base station to determine a spatial relationship for a group of physical uplink control channel (PUCCH) resources; and
at least one instruction to cause the base station to transmit a control message that indicates the spatial relationship,
wherein the control message implicitly identifies the group of PUCCH resources via identification of a PUCCH resource identifier that belongs to the group of PUCCH resources, and
wherein the PUCCH resource identifier renders a PUCCH group index of the group of PUCCH resources identifiable based on the PUCCH resource identifier and association information indicating an association between the group of PUCCH resources and the PUCCH group index.

* * * * *